Figure 1:
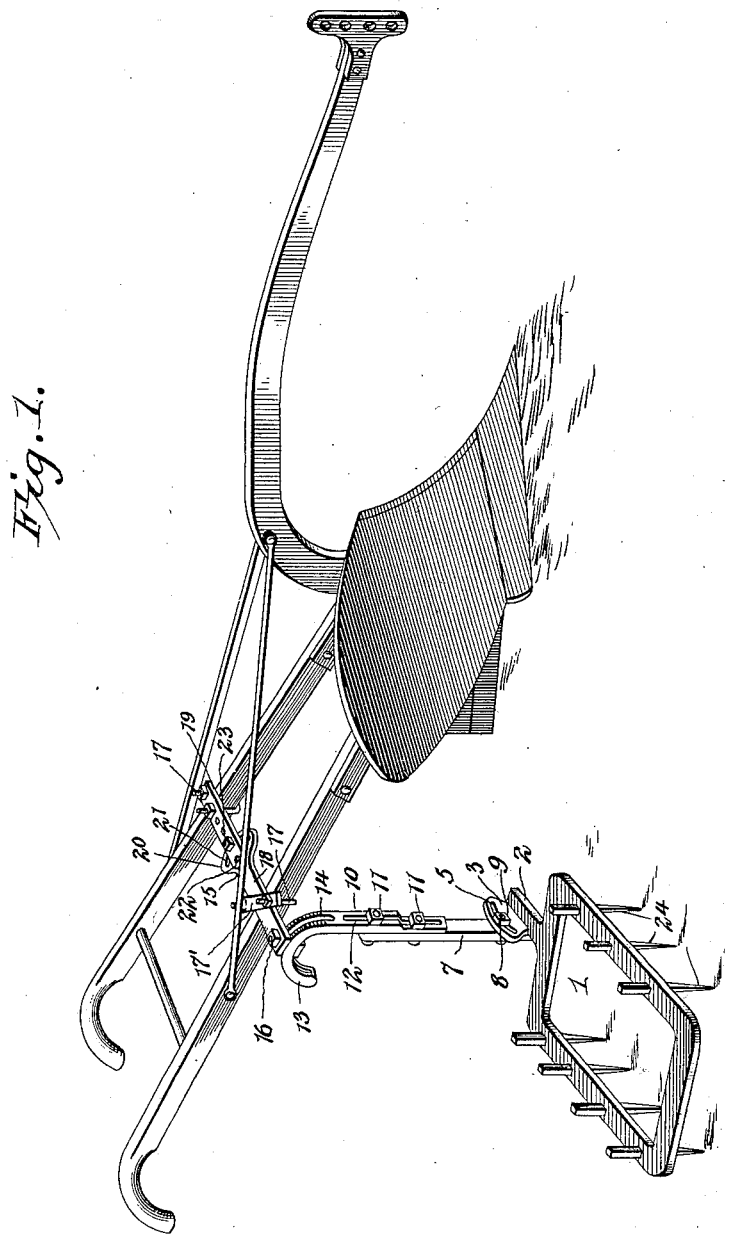

No. 658,306. Patented Sept. 18, 1900.
J. D. WHITTEN.
HARROW ATTACHMENT
(Application filed Jan. 17, 1900.)
(No Model.) 2 Sheets—Sheet 1.

Witnesses
Howard D. Orr.
J. W. Garner

John D. Whitten, Inventor.
By his Attorneys,
C. A. Snow & Co.

No. 658,306. Patented Sept. 18, 1900.
J. D. WHITTEN.
HARROW ATTACHMENT.
(Application filed Jan. 17, 1900.)
(No Model.) 2 Sheets—Sheet 2.
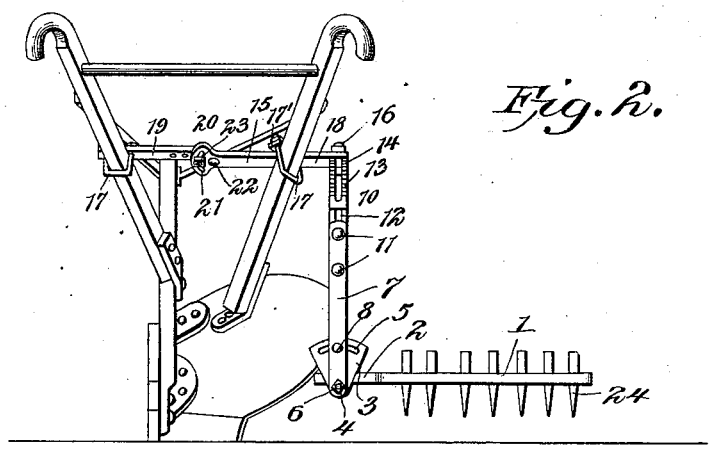
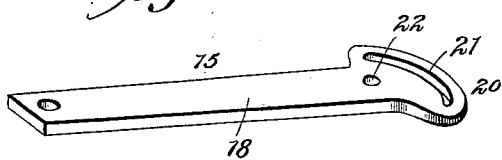
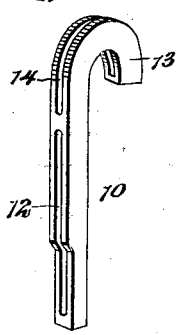
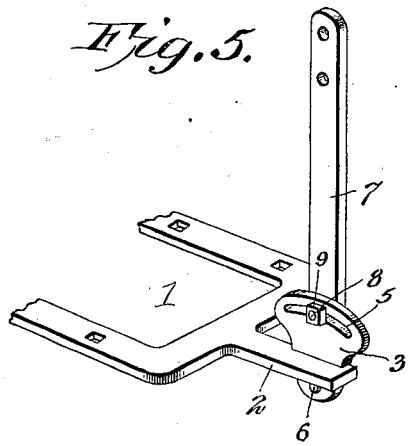
Witnesses
Howard D. Orr
J. W. Garner
John D. Whitten, Inventor
By his Attorneys,
C. A. Snow & Co.

United States Patent Office.

JOHN DOUGLAS WHITTEN, OF KINGSLEY, OREGON.

HARROW ATTACHMENT.

SPECIFICATION forming part of Letters Patent No. 658,306, dated September 18, 1900.

Application filed January 17, 1900. Serial No. 1,793. (No model.)

*To all whom it may concern:*

Be it known that I, JOHN DOUGLAS WHITTEN, a citizen of the United States, residing at Kingsley, in the county of Wasco and State of Oregon, have invented a new and useful Harrow Attachment, of which the following is a specification.

My invention is an improved harrow attachment for plows, one object of my invention being to provide a light, cheap, and simple attachment that is adapted to be used simultaneously with a turning-plow and to travel therewith upon the newly-turned furrow in rear of the moldboard and caused to thoroughly harrow and pulverize the freshly-turned soil, thus enabling the two operations of plowing and harrowing to be performed at the same time.

A further object of my invention is to provide a harrow attachment for plows which is capable of adjustment on the plow-handles to any required angle, which may be set and caused to operate in the ground at any required angle, and is pivotally secured to the trail-arm in such manner as to enable the harrow attachment to play vertically and clear stones and other obstructions, and also enable the harrow to be upturned on the trail-arm to permit the harrow to be put out of use.

To these ends my invention consists in the peculiar construction and combination of devices hereinafter fully set forth, and particularly pointed out in the claims.

In the accompanying drawings, Figure 1 is a perspective view of my improved harrow attachment, showing the same connected to and in operative position on a plow. Fig. 2 is a rear elevation of the same. Figs. 3, 4, and 5 are detail views.

The open rectangular harrow-frame 1 may be of suitable size and made either of wood or iron. As here shown said harrow-frame is made of iron and fashioned in a single piece. At the inner end of the harrow-frame is a horizontal extending arm 2, on one side of which is a vertically-disposed standard 3, provided at its lower end with a suitable pivotal opening 4 and at its upper side with the segmental slot 5, which is concentric with the opening 4.

Pivoted to a bolt 6, which enters the opening 4, is a trail-arm 7, which is thus attached to the harrow-frame and adapted to swing with relation thereto, and through said trail-arm extends an adjusting clamping-bolt 8, which plays in the segmental slot 5 and serves to secure the harrow-frame to the said trail-arm at any desired angle. When said bolt is loosened by turning the nut 9 thereon, the harrow-frame is adapted to swing on the said trail-arm, as will be readily understood, and hence adjust itself to inclinations and variations of the surface of the field. The said trail-arm is provided with the upper extended section 10, which is adjustable thereon and is secured thereto by clamping and adjusting bolts 11 in adjusting-slots 12, with which one or both of the members of the trail-arm are provided. The upper end of the extensible section 10 of said trail-arm is curved in the form of a semicircle, as at 13, said semicircular portion of said arm being provided with a slot 14.

A yoke-bar 15 has one end secured to and adapted to be adjusted on the curved portion 13 of the trail-arm by an adjusting and clamping bolt 16, which is operated in the slot 14. This yoke-bar serves as the means for connecting my improved harrow attachment to the plow, is disposed transversely on the plow-handle at any suitable point, and is secured thereto by means of U-shaped bolts 17 and a clamp-bar 17', engaged by one of said bolts. The said yoke-bar is composed of two sections 18 19. The section 18 has its inner end widened to form a segment 20, in which is a segment-slot 21, that is concentric with a pivotal bolt 22, that connects said sections together and permits them to be adjusted to any required angle with relation to each other. A clamping and adjusting bolt 23 in the section 19 and that operates in the segment-slot 21 serves to secure the said sections together at any required adjustment. The curved upper portion 13 of the trail-arm, to which the yoke-bar is secured and on which it may be adjusted, enables the harrow-frame to be maintained in a flat position on the ground no matter what may be the angle of inclination of the plow-handles.

The usual harrow-teeth 24 are inserted in suitable openings in the harrow-frame and any preferred number of said teeth may be used and spaced at any desired distance apart, the teeth being disposed in the front and rear sides of the harrow-frame.

My improved harrow attachment for plows is exceedingly light, cheap, and simple, is adapted to be used on all kinds of turning-plows now in common use, imposes no material or perceptible additional labor on the team or plowman, and thoroughly harrows and pulverizes the soil while it is being plowed.

Having thus described my invention, I claim—

1. The combination, in a harrow attachment for plows, of the yoke-bar adapted to be secured transversely on the plow-handle the trail-bar connected to one end of said yoke-bar and depending therefrom and adapted to be inclined and secured at any required angle with relation thereto, and the harrow-frame pivotally connected at its inner end to the lower end of said trail-bar, substantially as described.

2. In a harrow attachment for plows, the yoke-bar adapted to be secured transversely on the handles of a plow and comprising the two adjustable sections pivotally connected together and means to rigidly secure said sections together when adjusted, in combination with a depending trail-bar secured to one end of said yoke-bar, and the harrow-frame pivotally connected to the lower end of said trail-bar, substantially as described.

3. In a harrow attachment for plows, the combination, with the yoke-bar, adapted to be secured on the handles of a plow, of the trail-bar, having its upper end curved and secured to, and adjustable on, one end of the yoke-bar, and the harrow-frame attached to the lower end of said trail-bar, substantially as described.

4. In a harrow attachment for plows, the combination with the yoke-bar adapted to be secured on the handles of a plow, of the trail-bar having its upper end curved and secured to and adjustable on one end of said yoke-bar, said trail-bar being longitudinally extensible, and the harrow-frame pivotally connected to the lower end of said trail-bar.

In testimony that I claim the foregoing as my own I have hereto affixed my signature in the presence of two witnesses.

JOHN DOUGLAS WHITTEN.

Witnesses:
T. H. JOHNSTON,
WALDO BRIGHAM.